United States Patent [19]

Botto

[11] Patent Number: 4,674,660
[45] Date of Patent: Jun. 23, 1987

[54] MEASURING AND DISPENSING CANISTER

[76] Inventor: Joan Botto, 256 Laredo Dr., Palm Springs, Calif. 92264

[21] Appl. No.: 814,269

[22] Filed: Dec. 30, 1985

[51] Int. Cl.⁴ .................................................. G01F 11/36
[52] U.S. Cl. ...................... 222/181; 222/185; 222/305; 222/370; 222/439
[58] Field of Search .............. 222/305, 306, 307, 370, 222/168.5, 181, 264, 279, 367, 439, 440, 144, 185; 221/265

[56] References Cited

U.S. PATENT DOCUMENTS

| | | | |
|---|---|---|---|
| 868,641 | 10/1907 | Clark | 222/439 |
| 943,854 | 12/1909 | Whitten | 222/439 X |
| 977,112 | 11/1910 | Mandelberg | 222/181 |
| 1,065,116 | 6/1913 | Detmer | 222/370 X |
| 2,235,932 | 3/1941 | Kutil | 222/305 X |
| 2,805,799 | 9/1957 | Hileman | 222/370 X |
| 3,243,074 | 3/1966 | Rindner | 220/212 |
| 3,252,631 | 5/1966 | Sandifer | 222/439 |

FOREIGN PATENT DOCUMENTS 987345 8/1951 France .................... 222/370

Primary Examiner—Joseph J. Rolla
Assistant Examiner—Nils E. Pedersen
Attorney, Agent, or Firm—I. Louis Wolk

[57] ABSTRACT

A device for use in dispensing flowable materials comprising a container therefor having a dispensing opening on the bottom thereof which is adapted to be in selective alignment with a plurality of measuring tubes in a rotatable member which is rotatably positioned beneath said container, each of said measuring tubes being partitioned at a predetermined point by a removable tab to enable emission of a measured amount of material from such tube by removal of said tab.

7 Claims, 5 Drawing Figures

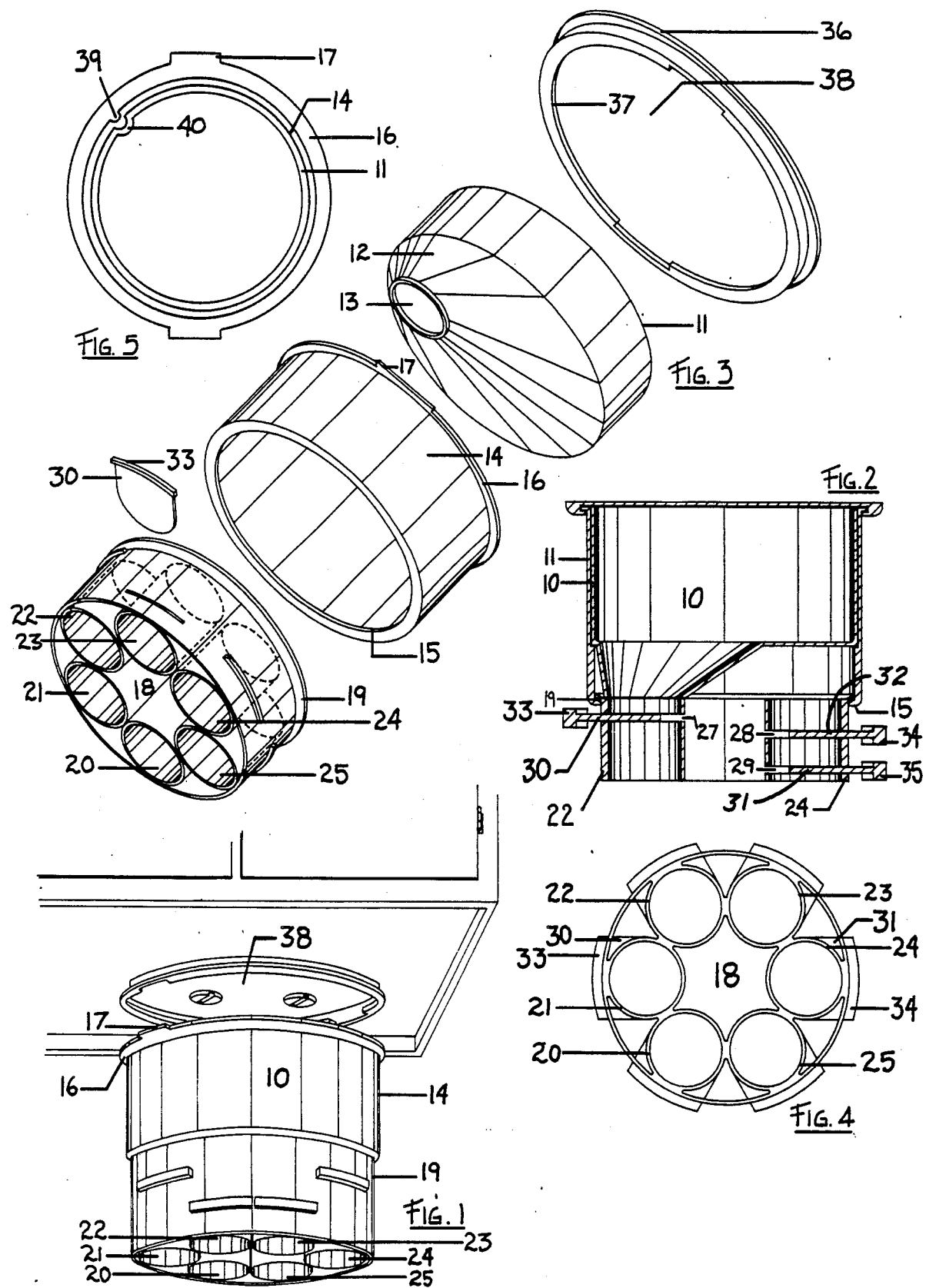

MEASURING AND DISPENSING CANISTER

BACKGROUND OF THE INVENTION

This invention relates to a storing and measuring dispenser for household or commercial use in dispensing fluid solid and liquid materials including various powdered, granular or flaked products. Such materials include various types of liquid and solid food products such as salad oils, juices, flour, sugar, cereals, coffee and the like as well as household products such as soap powder and other cleaning materials and similar flowable products which uses will be apparent from the structure of the assembly described herein.

The present invention provides means for dispensing materials of the type described in various measured units in a simple and convenient manner in an assembly which is compact and easily handled yet at the same time can be readily manufactured of molded materials and is easily assembled for use and disassembled for cleaning.

An object of the present invention, therefore, is to provide a dispensing container which will facilitate dispensing of dry fluid materials in various measured units.

A further object of the invention is to provide a dispensing container in which a plurality of separate measured quantities may be supplied selectively from a container for the materials in a compact and convenient assembly. A further object of the invention is to provide a dispensing container which may be formed of readily assembled and disassembled parts which may be formed of thermoplastic or molded material.

SUMMARY OF THE INVENTION

The present invention comprises a canister or receptacle for retaining the products to be dispensed. This container is preferably of cylindrical configuration and is provided with an outlet for the products, positioned at the bottom off-center or tangentially to the wall. This receptacle is positioned within a cylindrical retaining member which is provided with a bottom inwardly extending rim which supports and is engaged by a corresponding rim formed upon a dispensing assembly comprising a plurality of tubular members each of which is designed to deliver the fluid material to be dispensed in a measured quantity. This quantity is determined by the position of a removable insert or tab which functions as a gate valve and which is positioned transversely at a selected point in each measuring tube to permit the delivery of the desired measured quantity of material when the tab is removed as further described below. Said dispensing assembly is designed to rotate upon its rim which engages the aforesaid retaining rim so that each tubular measuring unit can selectively engage the opening in the container member to receive the material to be dispensed. Said material is retained within the tube by the tab insert which is positioned horizontally or transversely to the tab at a desired level in said tube depending upon the volume desired to be dispensed by said tube. For dispensing the material, the insert is removed and the material drops into the selected area for use. Preferably each dispensing tube is formed in two or more segments, each segment being separated by a space adequate to permit the tab to be inserted and retained in a closely fitted manner, and each tubular segment being designed to have a desired volume, as described in greater detail below. The assembled unit may be completely assembled and movable upon a kitchen counter or otherwise, or may be removably attached to a cover member which itself is attached to the underside of a kitchen cabinet or the like.

BRIEF DESCRIPTION OF THE DRAWING

FIG. 1 is a view front elevation of the assembled device shown with an under cabinet mount.

FIG. 2 is a view in vertical cross section of the assembled unit.

FIG. 3 is an enlarged exploded view showing the components of the device prior to assembly.

FIG. 4 is a view from the bottom of the assembled device of FIG. 1.

FIG. 5 is a top view in outline showing an interlocking groove arrangement for preventing axial movement of a container in its retention ring.

DETAILED DESCRIPTION

As shown in the drawings the assembled dispenser 10 (FIGS. 1 and 3) is composed of several components comprising a cylindrical container 11 of dimensions selected to retain a desired volume of fluid material to be dispensed having an open top and a bottom 12 formed with an off center tangentially positioned opening 13. Preferably the bottom is formed with a downward taper or contour in order to direct the contents toward the opening for dispensing the product as described further below. Container 11 is positioned and retained and anchored against rotation within a cylindrical retaining member in the form of a ring 14 which is provided at its bottom edge with an inwardly extending rim 15 and with an outwardly extending rim 16 along its upper edge, which rim is provided with one or more extensions 17 adapted to engage slots in a cover member as described further below. See also FIG. 5.

A dispensing member 18 is in the form of a cylindrical member having an outwardly extending rim 19 designed to overlap and rotatably engage rim 15 of ring 14 and within which are attached a plurality of dispensing tubular members 20, 21, 22, 23, 24 and 25 positioned circumferentially around the interior thereof and preferably in tangential contact with each other as shown particularly in FIGS. 3 and 4. These tubular members are in longitudinal alignment with ring 14 and container 11 and positioned so as to engage and communicate with discharge opening in the product container upon rotation of 19 relative thereto as further described herein. These tubular members have an inner diameter substantially equal to or possibly a little greater than the diameter of outlet 13 in order that when positioned in alignment therewith, the fluid material can properly enter the appropriate tubular segments. Each of these tubular members is in fact formed in two or more longitudinal segments separated by spaces as shown for example at 27, 28, 29 in FIG. 2 to accommodate closely fitting inserts as shown at 30, 31, 32 which are in the form of flat tabs with handles 33, 34, 35. These inserts as designed to function as gate valves to retain material to be dispensed within a selected volume of the corresponding tubular member prior to dispensing and then permit removal of said material by withdrawal when desired. The longitudinal spacing of the tubular segments and their related removable tab members is selected so as to provide a predetermined volume of material to be retained above each tab for dispensing when it is desired to do so. These tabs may be of suitable dimensions adapted to fit snugly within the spaced segments, for example, 1/16 to ⅛ inch in thickness with the spaces between segments corresponding thereto and having a length and width slightly greater than the dimensions of the tube.

As shown in FIG. 2, for example, tubular member 22 is formed in upper and lower segments separated by a space 27, within which tab 30 is slidably inserted to provide an upper space which accommodates a measured volume of material fed therein to from feeding member 12 and opening 13 in engagement therewith, which volume, for example, may be ⅛ cup.

Similarly, tube member 24 in FIG. 2 is formed of three segments divided into two superimposed sections by spaces 28 and 29 with a pair of tabs or slidable separators 31 and 32, with handles 34, 35. When the dispensing section 18 is rotated to register tube 25 with outlet 13, either tab 31 or 32 or both may be in the closed, fully inserted position. The sections may be designed, for example, so that each section accommodates ½ cup of fluid material and both sections accommodate 1 cup. When tab 31 is withdrawn and tab 32 is in closed position, the tube will receive 1 cup of material which can then be dispensed by withdrawing tab 32. When 31 is in closed or fully insertion position, ⅛ cup of material will be deposited and can be dispensed by its withdrawal. In the same way, section 18 by rotation to registering position with outlet 13 can supply each tube with a measured portion of fluid material to be dispensed by removal of the respective tab members.

In order to ensure proper registration of each dispensing tube with the container outlet a suitable marker point is placed upon outer ring 14 to indicate the position of the container outlet and marker points are placed upon the exterior of the dispensing section to indicate the position of each dispensing tube.

As shown in FIG. 4, as seen from the bottom of the assembly the several tab members are in closed position within their respective tubes 20–25 illustrated by 30 and 31 and their handles 33 and 34. The other tabs are similarly positioned.

Container 11 may be provided with any desired type of cover whether friction fitting or threaded. Where it is desired to mount the unit beneath a shelf or cabinet, as shown in FIGS. 1 and 3, the cover 36 may be formed with an inwardly extending rim 37 with slots 38 adapted to engage rim 16 of ring 14 by slipping over corresponding projections formed on rim 16 and rotatably sliding rim 37 under rim 16 to provide locking engagement therewith. For attachment to the cabinet or shelf underside the bed or cover may first be affixed by means of screws as shown in FIG. 1. Since container 11 is designed to be removably inserted within ring member 14, it should be restrained against axial rotation and also to ensure proper positioning of its outlet vis a vis the tubular dispensing units. This can be accomplished as shown in FIG. 5 by forming a vertical groove or depression 40 in the wall of the container 11 which is in vertically slidable registry with a corresponding groove 40 in the wall of ring 14. Thus the container can be left in or out of the ring and after refilling can be reinserted in the same position. Other means of restricting movement may also be used.

To further describe the assembly and operation of the device of this invention, tubular unit 18 with valve tabs in closed position is placed within ring member 14 with its rim 19 superimposed upon inwardly extending rim 15 and is rotable therewith. Product container 11 is then inserted within ring 14 and locked into position so that it will be prevented against rotation, either by means of interlocking grooves as shown in FIG. 5 or by means of a set screw, or similar locking means.

Where it is desired to utilize the device to dispense liquid material, the engaging surfaces of rims 15 and 19 may be provided with a layer of gasketing material such as soft plastic or a rubberized material to prevent leakage. For use with powders such provision is not necessary.

After the product container is positioned within ring 14, the assembly may then be affixed to the lid attached to the cabinet (see FIG. 1) and by rotation of 18 the respective tubes are aligned with opening 13 to receive the desired volume of material. When such material is required for use, unit 18 is rotated so that outlet 13 is no longer in alignment with the tube in question, the tab is withdrawn and the material deposited in any desired container.

Although the tubes described herein are cylindrical, they can be of any desired cross sectional configuration, i.e., rectangular, triangular, elliptical, etc., with the valve tabs shaped to correspond and the opening in the container portion can be of the same shape.

The device described herein may be constructed or assembled from various materials such as sheet metal, i.e., aluminum, sheet plastics, etc., or may be cast or moulded of various plastic materials such as polyacrylates, polyvinyl chloride, polyethylene, polypropylene, etc., as will be obvious to those skilled in the art. Dimensions of the container and dispensing tubes can be determined by the volume of material to be dispensed. For domestic use, containers may be designed to hold 1–5 pounds or more of flowable material, i.e., coffee, sugar, or flour and the like, the dispensing tubes designed to accommodate volumes corresponding to ⅛, ¼, ⅓, ⅔, ¾ and 1 cup or more as will be obvious. For commercial use, the components and measurements would be increased correspondingly.

I claim:

1. A dispensing device for household use for dispensing flowable material such as food and household products and the like adapted to selectivity dispense such material from a plurality of measuring units of predetermined volume which comprises a cylindrical ring member having an inwardly extending bottom rim, a cylindrical dispensing member having an outwardly extending rim depending from said member positioned with its rim in rotational engagement with the inwardly extending rim of said ring, around the longitudinal axis thereof said dispensing member comprising a plurality of longitudinally extending tubular measuring units spaced circumferentially adjacent to each other and to the inner surface of said dispensing member such tubular members being open at each end, and a container for said flowable material positioned within said ring member above the said inwardly extending rim thereof and above the outwardly extending rim of said dispensing unit, said container having an opening in the bottom thereof for discharge of material said opening being formed off center of the container's longitudinal axis at a position which will permit successive alignment of the openings of the respective tubular members in the dispensing member upon rotation thereof, each of said tubular members being provided with a transversely movable partition to permit retention or removal of material deposited in any given tubular member.

2. A measuring dispenser according to claim 1 wherein each of said tubular units is in the form of two or more longitudinally spaced segments separated by removable tabs which define a predetermined volume in said members.

3. A dispensing device according to claim 2 wherein the tubular units are cylinders.

4. A measuring dispenser according to claim 1 wherein the cylindrical ring member, is provided with a cover in locking position thereon.

5. A dispensing device according to claim 4 wherein the said cover is affixed to the underside of a shelf or cabinet or the like to permit removable attachment thereto of said dispensing device.

6. A dispensing device according to claim 1 wherein said container for said flowable material is restrained against rotational movement within said ring member by means of a vertical groove in interlocking vertically slidable engagement with a corresponding groove in the wall of said ring.

7. A dispensing device for household use for dispensing flowable material such as food and household products from a plurality of measuring units of predetermined volume which comprises a cylindrical ring member, a cylindrical dispensing structure comprising a plurality of vertically positioned tubular measuring units spaced circumferentially adjacent to each other around the inner periphery of the said dispensing structure said tubular measuring units being open at the top and bottom thereof, said dispensing structure being positioned within and depending from a bottom edge of said cylindrical ring member and rotatable around said bottom edge and around the central axis of said cylindrical ring member as a unit, and a cylindrical container for said flowable material positioned within said circular ring member above said dispensing structure and interlocked and concentric therewith said container having an opening in the bottom thereof for discharge of material, said opening being formed off-center of the container's longitudinal axis at a position which will permit successive alignment of the top openings of said tubular measuring units in the said dispensing member upon rotation thereof for deposition of said flowable material into said units, each of said tubular units being provided with a transversely movable partition to permit retention or removal of said flowable material deposited in any given tubular unit.

* * * * *